W. J. WOODS.
MOLD FOR FORMING GLASS ARTICLES.
APPLICATION FILED DEC. 20, 1911.
1,028,413.
Patented June 4, 1912.
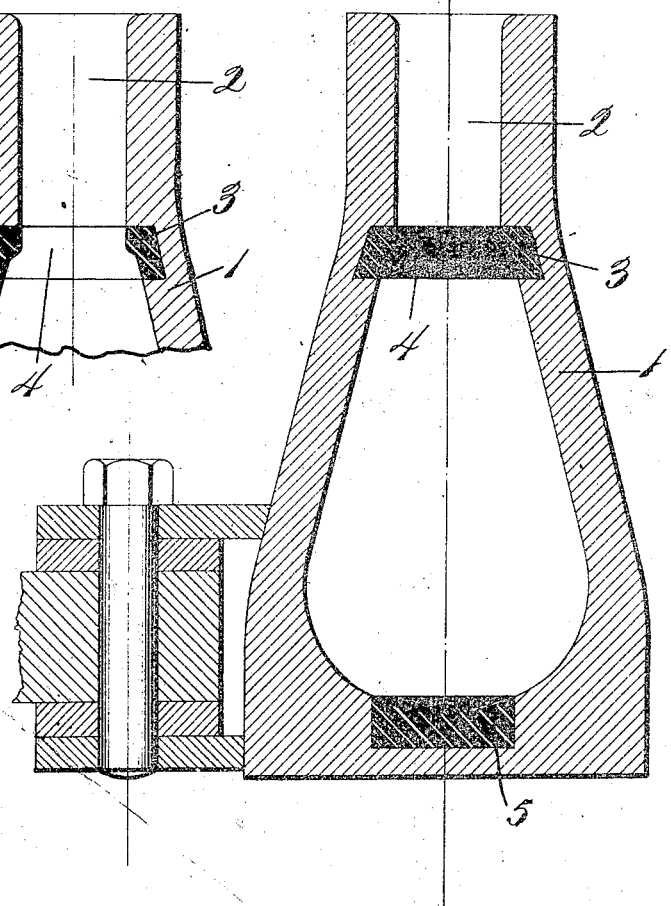

UNITED STATES PATENT OFFICE.

WILLIAM JAMES WOODS, OF CORNING, NEW YORK, ASSIGNOR TO CORNING GLASS WORKS, OF CORNING, NEW YORK, A CORPORATION OF NEW YORK.

MOLD FOR FORMING GLASS ARTICLES.

1,028,413.   Specification of Letters Patent.   Patented June 4, 1912.

Application filed December 20, 1911. Serial No. 667,026.

*To all whom it may concern:*

Be it known that I, WILLIAM JAMES WOODS, a citizen of the United States of America, and a resident of Corning, county of Steuben, and State of New York, have invented certain new and useful Improvements in Molds for Forming Glass Articles, of which the following is a specification.

In the manufacture of certain classes of blown articles in which there is an abrupt change in the contour of the article, or in which different parts thereof come into contact with the mold walls successively, stresses are apt to be set up in the glass, which are detrimental to its durability. This is particularly true in blowing electric lamp bulbs in which a restricted neck is immediately adjacent to a flaring shoulder, from the latter of which a body of the bulb depends. In blowing, the flow of metal at the opposite sides of the angles thus formed is unlike and in consequence internal stresses are set up in the bulb when blown in the molds now commonly employed. It is also true at the base of the bulb, due to the fact that the bottom of the gather comes into contact with the bottom of the mold cavity before the bulb is fully blown.

My invention has for its object to eliminate these internal stresses not by a change in the configuration of the article blown, but by properly controlling the condition of the glass during the blowing, whereby the glass at what would otherwise be the stress point, is held in a mobile condition until the glass on the adjacent sides thereof has been given the desired shape. This I accomplish by retaining the heat of the gather at the stress point until the parts on the opposite sides thereof have been more or less shaped, whereby the glass at such stress point may before cooling accommodate itself to the required flow. This retardation of the cooling of the glass is accomplished by the construction of the mold in which the article is formed, and which according to this invention is provided at points where stresses would otherwise occur with sections of low conductivity whereby the heat of the gather at the point indicated is retained, and it therefore consists in the construction of the mold by which the desired results is obtained.

Referring to the accompanying drawings in which corresponding parts are designated by corresponding marks of reference: Figure 1 is a vertical section of the mold constructed in accordance with this invention. Fig. 2 is a fragmental elevation thereof showing more clearly the shaping of the mold and the location of the point of differences of glass flow.

The mold 1 shown in these drawings is of the internal contour generally employed in blowing of electric lamp bulbs although it is obvious that the shape which is given to the mold will depend upon the article which is to be blown, and that in describing my invention as embodied in an electric bulb mold I am only doing so in order to more clearly describe a specific form of my generic invention. It is well known that the molds of this character are of iron coated on the inside with a layer of carbon. With such molds the cooling of the glass when in contact with the mold walls is rapid and in the case of a bulb blown in the mold of the form shown, the internal stresses are set up in the ordinary mold at the junction of the cylindrical portion 2 forming the neck of the bulb and the flared portion 3 forming the shoulder thereof. The glass which forms the bulb at the junction of these parts comes into contact with the mold walls in the earlier stage of the blowing and is chilled while the lower part of the gather is still being expended to form the portion of the bulb below such neck. From this results a strain at the junction point due to the flow of glass upon the cooled neck portion. In order to prevent this sudden cooling of the glass at the point indicated I inset in the mold at the point indicated a zone 4, of low heat conductivity, such for instance as soap-stone, plaster of Paris, etc., the inner face of such zone forming the inner wall of the mold at the point indicated. This zone retards the cooling of the glass adjacent thereto and therefore the flow of glass at such point while the latter is still fluid, eliminating the stresses which otherwise results therein. Inasmuch as stresses might otherwise be set up between the junction of the shoulder and the enlarged bulb portion therebelow, I prefer to make the zone 4 as shown in the figures wide enough to include not only the junction of the shoulder with the neck but also with the bulb portion below the shoulder.

As an example of stress occuring by reason of the different times at which the gather may come into contact with the mold, I refer to the stress existing at the base of an electric lamp bulb. Such stresses may be obviated by local heat retaining zones wherever they occur, thus in Fig. 1 I have shown the mold with a heat retaining section 5 in the bottom of the mold cavity whereby the cooling of that part of the bulb is retarded until the adjacent walls have been shaped.

It will be further seen that my invention is not limited in its applicability to molds for blown glass articles, but may be employed in molds for pressed work when corresponding conditions of glass may be encountered.

Having thus described my invention what I claim is:

1. A mold for glass articles, having a section therein at the point where an abrupt change is made in the contour of the article which is to be blown therein, the said section having lower heat conductivity than other parts of the mold which come in contact with the glass from which the article is to be blown.

2. A mold for glass articles, having therein means for locally retarding the cooling of the glass at the point where the contour of the article to be blown changes in respect to the cooling of the glass at other points.

3. In a mold for blowing electric light bulbs having a restricted neck adjacent to a shoulder, a zone of heat non-conducting material located within the interior of the mold and forming part of the interior thereof located at the junction of the neck and shoulder parts of the mold said zone being of smaller heat conductivity than adjacent portions of the interior of the mold.

4. A mold for glass articles having its molding walls formed in sections of materials of different heat conductivity, one of such sections being adapted to locally retard the cooling of the glass while the adjacent section is shaping and cooling the glass.

In testimony whereof I have hereunto set my hand in the presence of two witnesses.

WILLIAM JAMES WOODS.

Witnesses:
VERNON M. DORSEY,
BENJ. D. CHAMBERLIN.